(12) United States Patent
Nyga et al.

(10) Patent No.: US 11,732,785 B2
(45) Date of Patent: Aug. 22, 2023

(54) CHAIN GUIDE MECHANISM

(71) Applicant: TSUBAKIMOTO CHAIN CO., Osaka (JP)

(72) Inventors: Volkmar Nyga, Osaka (JP); Seigo Ohsawa, Osaka (JP); Munehiro Maeda, Osaka (JP); Yuji Oshima, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 17/519,691

(22) Filed: Nov. 5, 2021

(65) Prior Publication Data

US 2022/0228649 A1 Jul. 21, 2022

(30) Foreign Application Priority Data

Jan. 15, 2021 (JP) ................. 2021-004890

(51) Int. Cl.
| | | |
|---|---|---|
| *F16H 7/18* | (2006.01) | |
| *F16H 7/06* | (2006.01) | |
| *F16H 7/08* | (2006.01) | |
| *F01L 1/02* | (2006.01) | |

(52) U.S. Cl.
CPC ................ *F16H 7/18* (2013.01); *F16H 7/06* (2013.01); *F16H 7/08* (2013.01); *F01L 1/022* (2013.01); *F16H 2007/0872* (2013.01); *F16H 2007/0893* (2013.01); *F16H 2007/185* (2013.01)

(58) Field of Classification Search
CPC ...... F16H 7/06; F16H 7/08; F16H 2007/0863; F16H 2007/0872; F16H 2007/0893; F16H 7/18; F16H 2007/185; F16H 2007/0842; F16H 2007/0844; F02B 67/04; F02B 67/06; F01L 1/022; F01L 2001/028
See application file for complete search history.

(56) References Cited

U.S. PATENT DOCUMENTS 3,869,138 A * 3/1975 Allison .................... B62D 3/02
474/111
4,642,073 A * 2/1987 Ancarani Restelli ..... F16H 7/18
474/151

(Continued)

FOREIGN PATENT DOCUMENTS

DE        10105224 A1 *  8/2002  ............... F16H 7/18
DE    102010005405 A1 *  7/2011  ............... F01L 1/02

(Continued)

*Primary Examiner* — Michael R Mansen
*Assistant Examiner* — Raveen J Dias
(74) *Attorney, Agent, or Firm* — WHDA, LLP (57) ABSTRACT

An object of the present invention is to provide a chain guide mechanism that can readily integrate all the components in a simple structure and enhance work efficiency during assembly or maintenance. The chain guide mechanism of the present invention is configured to be able to integrally support, on a frame, components including a plurality of sprockets, a chain, a fixed chain guide, and a pivoting chain guide. The frame includes a pivoting chain guide holding part that holds a mounting boss of the pivoting chain guide in a state of a loose fit. The pivoting chain guide holding part is configured to allow the mounting boss to be fitted therethrough from one side.

4 Claims, 9 Drawing Sheets

(56) References Cited

U.S. PATENT DOCUMENTS

| | | | | |
|---|---|---|---|---|
| 5,425,680 A * | 6/1995 | Young | F16H 7/08 | 474/111 |
| 5,797,818 A * | 8/1998 | Young | F16H 7/18 | 474/111 |
| 6,238,311 B1 * | 5/2001 | Cutting | F16H 7/08 | 474/140 |
| 6,620,067 B1 * | 9/2003 | Nakamura | F01L 1/024 | 474/140 |
| 6,923,154 B2 * | 8/2005 | Gschwindt | F02F 7/0073 | 123/195 C |
| 7,140,604 B2 * | 11/2006 | Oba | F02F 7/0073 | 269/287 |
| 7,241,240 B2 * | 7/2007 | Cholewczynski | F16H 7/0829 | 474/111 |
| 7,455,606 B2 * | 11/2008 | Markley | F16H 7/0848 | 474/111 |
| 7,537,533 B2 * | 5/2009 | Wigsten | F16H 7/08 | 474/111 |
| 8,387,244 B2 * | 3/2013 | Markley | F16H 7/08 | 123/90.31 |
| 8,454,462 B2 * | 6/2013 | Konno | F16H 7/08 | 474/140 |
| 8,465,385 B2 * | 6/2013 | Konno | F16H 7/08 | 474/140 |
| 8,550,943 B2 * | 10/2013 | Kroon | F01L 1/02 | 474/111 |
| 8,579,746 B2 * | 11/2013 | Mori | F16H 7/08 | 474/140 |
| 8,672,785 B2 * | 3/2014 | Young | F16H 7/08 | 474/111 |
| 10,738,862 B2 * | 8/2020 | Maeda | F16H 7/08 | |
| 2002/0045503 A1 * | 4/2002 | Young | F16H 7/18 | 474/140 |
| 2004/0005952 A1 * | 1/2004 | Bachmair | F01L 1/02 | 474/140 |
| 2004/0149250 A1 * | 8/2004 | Gschwindt | F01L 1/02 | 123/90.31 |
| 2004/0182981 A1 * | 9/2004 | Oba | F01L 1/02 | 248/346.03 |
| 2005/0075204 A1 * | 4/2005 | Cholewczynski | F16H 7/18 | 474/140 |
| 2005/0130776 A1 * | 6/2005 | Markley | F16H 7/24 | 474/140 |
| 2006/0234819 A1 * | 10/2006 | Markley | F16H 7/0848 | 474/140 |
| 2007/0173362 A1 * | 7/2007 | Ullein | F01L 1/024 | 474/140 |
| 2008/0280710 A1 * | 11/2008 | Fuhrmann | F16H 7/08 | 474/109 |
| 2009/0197724 A1 * | 8/2009 | Young | F16B 39/32 | 474/133 |
| 2009/0205206 A1 * | 8/2009 | Markley | F16H 7/08 | 474/140 |
| 2010/0210384 A1 * | 8/2010 | Young | F16H 7/08 | 474/111 |
| 2010/0248876 A1 * | 9/2010 | Kroon | F16H 7/18 | 474/111 |
| 2011/0015014 A1 * | 1/2011 | Kroon | F16H 7/08 | 474/111 |
| 2011/0105258 A1 * | 5/2011 | Konno | F16H 7/08 | 474/140 |
| 2011/0183797 A1 * | 7/2011 | Konno | F16H 7/08 | 474/111 |
| 2011/0251002 A1 * | 10/2011 | Mori | F16H 7/06 | 474/140 |
| 2012/0035010 A1 * | 2/2012 | Young | F16H 7/08 | 474/111 |
| 2012/0052997 A1 * | 3/2012 | Young | F16H 7/08 | 474/111 |
| 2018/0231106 A1 * | 8/2018 | Stiglmaier | F02B 67/06 | |
| 2018/0291987 A1 | 10/2018 | Maeda et al. | | |
| 2018/0334928 A1 * | 11/2018 | Yamauchi | F16H 7/08 | |
| 2022/0221030 A1 * | 7/2022 | Murai | F16H 7/18 | |

FOREIGN PATENT DOCUMENTS

| | | | | |
|---|---|---|---|---|
| DE | 102011075155 A1 * | 11/2012 | | F16H 7/18 |
| DE | 102018117985 A1 * | 1/2020 | | |
| DE | 102018130732 A1 * | 5/2020 | | F02B 67/06 |
| DE | 102018130733 A1 * | 5/2020 | | F02B 67/06 |
| EP | 0848139 A1 * | 6/1998 | | F16H 7/08 |
| EP | 1321631 B1 * | 3/2005 | | F16H 7/02 |
| JP | 2018-179086 A | 11/2018 | | |
| WO | WO-2019201391 A1 * | 10/2019 | | F16H 7/18 |

* cited by examiner

CHAIN GUIDE MECHANISM

BACKGROUND OF THE INVENTION

1. Field of the Invention

The present invention relates to a chain guide mechanism suitable for a timing system of an engine, for example, in which chain guides keep tension and slidably guide a chain that is passed over sprockets respectively provided to a crankshaft and camshafts inside the engine room.

2. Description of the Related Art

A chain guide mechanism for a timing system is known, which is installed in a car engine room to slidably guide a running chain and keep correct tension between sprockets.

One type of chain guide mechanism is configured to include, for example, a pivoting chain guide pivotably attached to an engine block, which is a mounting target, on the slack side of the chain run line, and a fixed chain guide fixedly attached to the engine block on the tight side of the chain run line.

One problem with such a chain guide mechanism was poor work efficiency during assembly or maintenance, since it was necessary to install or remove each of a plurality of sprockets, pivoting chain guide, and fixed chain guide, and to lay or remove the chain, separately.

For better work efficiency during assembly or maintenance, there has been proposed a timing system that adopts a chain guide mechanism that integrally holds a pivoting chain guide and a fixed chain guide by connecting these guides (see, for example, Japanese Patent Application Publication No. 2018-179086).

The chain guide mechanism described in Japanese Patent Application Publication No. 2018-179086 joins the pivoting chain guide and fixed chain guide together by a connection unit, which is composed of a pair of arm members extending from both sides, across the chain, of the chain run side of the fixed chain guide toward the pivoting chain guide, and a joint member having a pair of connection arms extending from both sides, across the chain, of the chain run side of the pivoting chain guide toward the arm members.

In the chain guide mechanism, the arm members are formed integrally with the guide shoe of the fixed chain guide, and the guide shoe is fixed to a fixed guide support member, so that the fixed chain guide and the arm members are united. A mounting boss on the pivoting chain guide is fitted into a fitting hole in the joint member to unite them, and engaging protrusions provided on the joint member are inserted in and engaged with engaging holes formed in the arm members. In this way, the chain guide mechanism is able to integrally hold the fixed chain guide and the pivoting chain guide.

SUMMARY OF THE INVENTION

However, the abovementioned chain guide mechanism has an increased number of components because the joint member, which is provided with the fitting hole in which the mounting boss of the pivoting chain guide is fitted, is provided as a separate part from the arm members that are formed integrally with the fixed chain guide.

Another problem is that, when connecting the fixed chain guide with the pivoting chain guide, the process of inserting the engaging protrusions on the joint member into the engaging holes of the arm members is not easy and time-consuming.

After the fixed chain guide has been connected with the pivoting chain guide, the pivoting chain guide, which is not fixed but freely movable, tends to make it more difficult to install other components. Moreover, the overall large number of steps to unite the fixed chain guide, pivoting chain guide, and other components make it harder to achieve a significant improvement in work efficiency.

The present invention has been made in view of the circumstances described above, its object being to provide a chain guide mechanism that can readily integrate all the components in a simple structure for better work efficiency during assembly or maintenance.

The present invention solves the above problems by providing a chain guide mechanism capable of integrally supporting components on a frame, the components including a plurality of sprockets, a chain that is passed over the plurality of sprockets, and a fixed chain guide and a pivoting chain guide that slidably guide the chain. The pivoting chain guide includes a cylindrical mounting boss protruding outward from one side in a guide width direction. The frame includes a sprocket support part that supports each of the plurality of sprockets when the chain is passed over the sprockets, a fixed chain guide support part that supports the fixed chain guide, and a pivoting chain guide holding part that holds the mounting boss in a state of a loose fit. The pivoting chain guide holding part is configured to allow the mounting boss to be fitted therethrough from one side.

According to the chain guide mechanism set forth in claim 1, the components including a plurality of sprockets, chain, fixed chain guide, and pivoting chain guide are integrally supported on a frame and can be assembled into a unit. The pivoting chain guide holding part of the frame is configured to allow the mounting boss of the pivoting chain guide to be fitted therethrough from one side. In this way, the pivoting chain guide can be connected to and separated from the frame easily with a simple structure. As this facilitates integration of the frame and the pivoting chain guide, the work efficiency during assembly or maintenance can be improved.

Since there is no need to prepare a separate joint member for uniting the pivoting chain guide with other components, there is no weight increase caused by an increased number of components, and a fuel economy loss can be avoided.

According to the configuration set forth in claim 2, the mounting boss, has, on an outer circumferential surface, a double flat side part, while the pivoting chain guide holding part includes a loose fit part and guide portions. The pivoting chain guide holding part is configured so as to hold the pivoting chain guide in a pivotable manner when the double flat side part is inserted between opposite inner side faces of the guide portions and the pivoting chain guide is rotated. This configuration prevents the pivoting chain guide from separating from the frame and reliably unites them, which helps improve the work efficiency during assembly or maintenance.

According to the configuration set forth in claim 3, an outer circumferential surface at a distal end of the mounting boss is formed with a retainer part, which, when one side of the pivoting chain guide is in surface contact with one face of the pivoting chain guide holding part, engages with another face of the pivoting chain guide holding part. This configuration reliably prevents the pivoting chain guide from tilting when the pivoting chain is attached to the frame, which helps improve the work efficiency during assembly or maintenance.

According to the configuration set forth in claim 4, the retainer part is made up of a plurality of locking tabs circumferentially spaced apart on the mounting boss such that at least two locking tabs always engage with the other face of the pivoting chain guide holding part. This helps simplify the structure of the assembly and improves its formability.

According to the configuration set forth in claim 5, the pivoting chain guide holding part includes a planar restricting part on an outer side on a rear side in a chain running direction of the loose fit part to restrict pivoting movement of the pivoting chain guide during assembly, and the restricting part is formed with an engaging notch on a face thereof positioned on the pivoting chain guide side. The pivoting chain guide is formed with, on one side thereof, an engaging protrusion, which is to be engaged with the engaging notch and configured to be able to engage with a side face of the restricting part when the pivoting chain guide is rotated. When assembling the components into a unit, the engaging protrusion of the pivoting chain guide is engaged with the engaging notch to fasten the pivoting chain guide. When installing the chain guide mechanism into an internal combustion engine, the engaging protrusion is engaged with the side face of the restricting part so that the pivoting chain guide is prohibited from rotating in a direction away from the chain. This function that fastens the pivoting chain guide in two stages restricts free pivoting of the pivoting chain guide and further helps improve the work efficiency during assembly or maintenance.

DESCRIPTION OF THE PREFERRED EMBODIMENTS

The present invention can have any specific forms of embodiment as long as it provides a chain guide mechanism capable of integrally supporting components on a frame, the components including a plurality of sprockets, a chain passed over the plurality of sprockets, and a fixed chain guide and a pivoting chain guide that slidably guide the chain, the pivoting chain guide including a cylindrical mounting boss protruding outward from one side in a guide width direction, the frame including a sprocket support part that supports each of the plurality of sprockets when the chain is passed over the sprockets, a fixed chain guide support part that supports the fixed chain guide, and a pivoting chain guide holding part that holds the mounting boss with a loose fit, and the pivoting chain guide holding part being configured to allow the mounting boss to be fitted thereto from one side.

The chain running surfaces of the fixed chain guide and pivoting chain guide in the chain guide mechanism of the present invention may be formed integrally with the chain guides of a material having favorable sliding properties, or a guide shoe that allows favorable sliding of the chain may be removably attached to the chain guides.

The fixed chain guide, pivoting chain guide, and guide shoes in the chain guide mechanism of the present invention may be made of any material that has low friction resistance. Specifically, materials that exhibit durability in high-temperature environments and can allow the chain to run smoothly in sliding contact are preferable. For example, synthetic resin materials such as polyamide 6 resin, polyamide 46 resin, polyamide 66 resin, and polyacetal resin can be preferably used.

In a case where the fixed chain guide and pivoting chain guide have a guide shoe, the guide body that supports the guide shoe may be made of metal such as iron or aluminum.

A chain guide mechanism according to the present invention will be hereinafter described in more detail with reference to the drawings.

Figure 1:
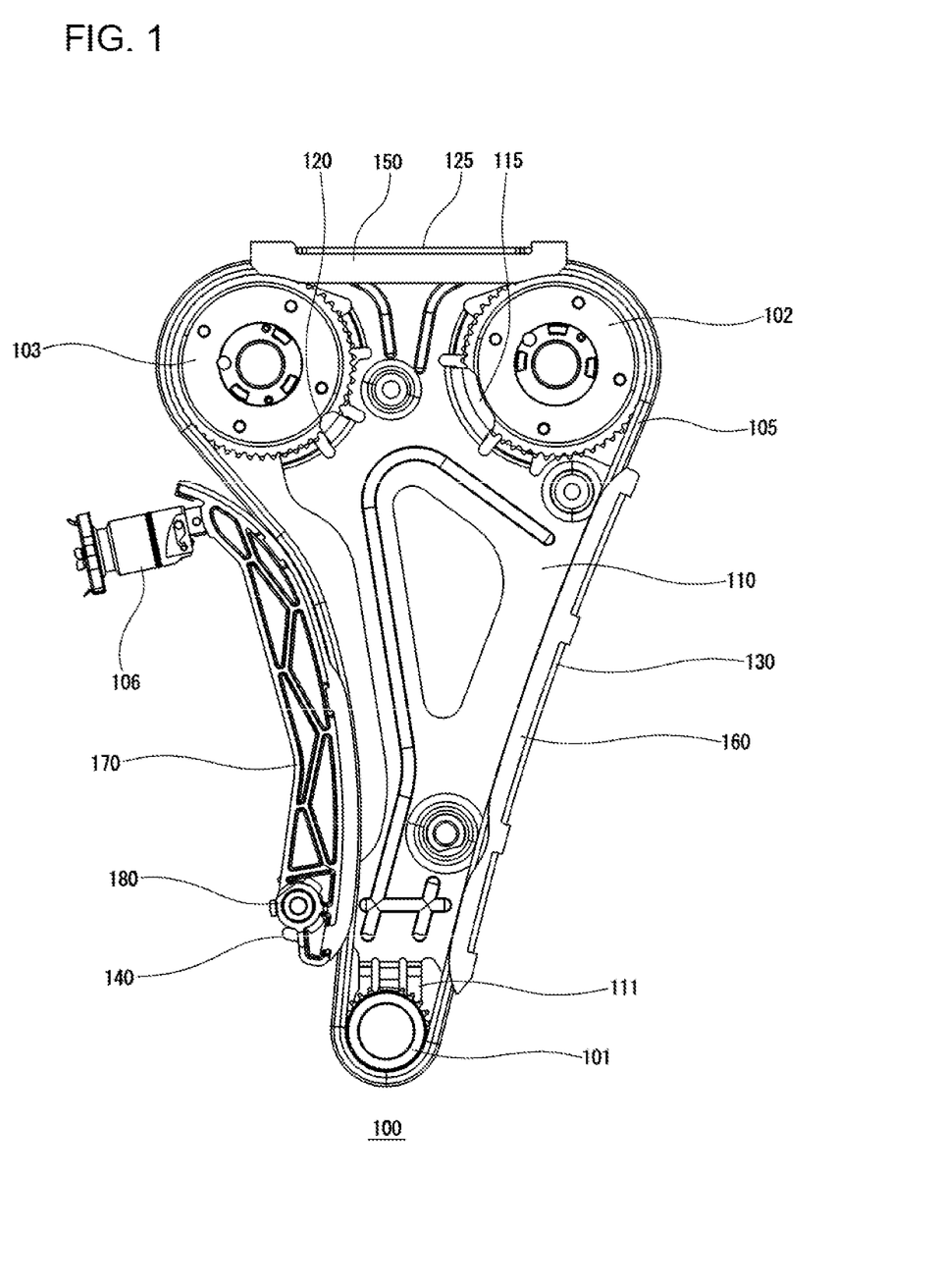
FIG. 1 is a plan view illustrating one mode of use of a chain guide mechanism according to one embodiment of the present invention.

As illustrated in FIG. 1, the chain guide mechanism 100 according to the present invention is configured to be able to integrally support, on a metal plate frame 110, components including a drive-side sprocket 101 provided to a crankshaft, two driven-side sprockets 102 and 103 each provided to each of two cam shafts, a chain 105 passed over the drive-side sprocket 101 and the driven-side sprockets 102 and 103, a top guide 150 and a fixed chain guide 160 each slidably guiding the running chain 105, and a pivoting chain guide 170 keeping correct chain tension while slidably guiding the running chain 105. Reference numeral 106 in FIG. 1 denotes a tensioner.

Figure 2:
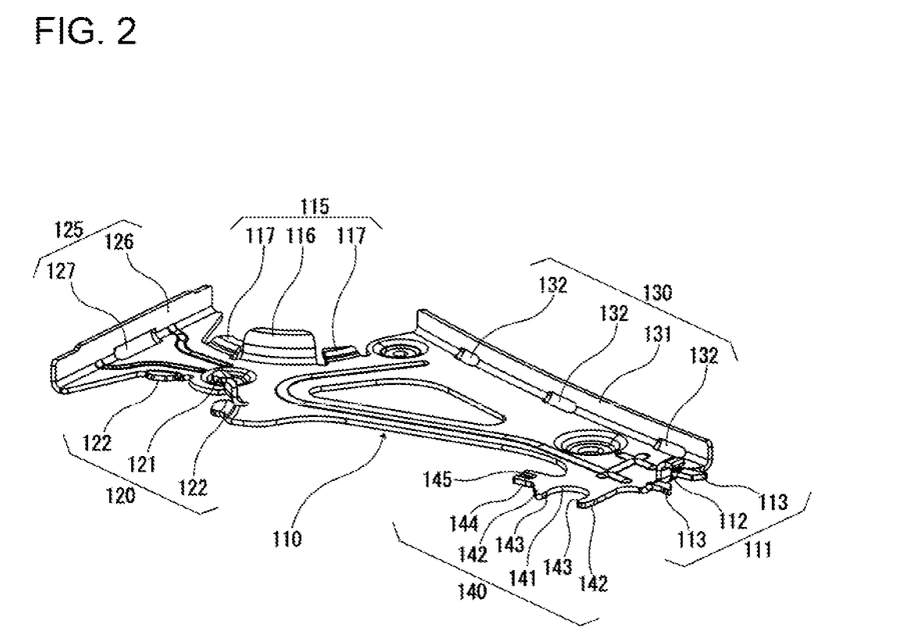
FIG. 2 is a perspective view illustrating a configuration of a frame in the chain guide mechanism illustrated in FIG. 1.

The frame 110 is formed by processing a metal plate member and includes, as illustrated in FIG. 2, a drive-side sprocket support part 111, driven-side sprocket support parts 115 and 120, a top guide support part 125, a fixed chain guide support part 130, and a pivoting chain guide holding part 140.

The drive-side sprocket support part 111 is formed at one end of a planar frame substrate, and includes a locking tab 112 that engages with one side of a gear part of the drive-side sprocket 101, and a pair of pressing tabs 113 on both sides of the locking tab 112 for supporting the other side of the gear part of the drive-side sprocket 101. The locking tab 112 and pressing tabs 113 are each formed to have a side face in a zigzag shape and tips positioned at different heights.

The driven-side sprocket support parts 115 and 120 are provided side by side on the other end of the frame substrate. The driven-side sprocket support part 115 includes a locking tab 116 that engages with one side of a gear part of the driven-side sprocket 102, and a pair of pressing tabs 117 on both sides of the locking tab 116 along a circular arc for supporting the other side of the gear part of the driven-side sprocket 102.

The other driven-side sprocket support part 120 is configured similarly to the driven-side sprocket support part 115 and includes a locking tab 121 and two pressing tabs 122.

The top guide support part 125 is formed by a support wall 126, which is an edge portion at the other end of the frame substrate (top-side edge portion) bent substantially at right angles to one side and extends along a guide longitudinal direction.

In the bent corner of the frame substrate, in a center part in the guide longitudinal direction, is formed an engaging hole 127, which is an elongated slot extending in the guide longitudinal direction.

The fixed chain guide support part 130 is formed by a support wall 131, which is a side edge portion of the frame substrate on the tight side of the chain run line bent substantially at right angles to one side and extends along the chain run line.

In the bent corner of the frame substrate are formed a plurality of engaging holes 132 spaced apart from each other along the guide longitudinal direction. Each of the engaging holes 132 is formed as an elongated slot extending in the guide longitudinal direction, for example.

The pivoting chain guide holding part 140 is formed in a side edge portion at one end (bottom end) of the frame substrate on the slack side of the chain run line.

The pivoting chain guide holding part 140 includes a substantially C-shape loose fit part 141 and guide portions 142 each continuous with each of both ends of the loose fit part 141.

Inner side faces 143 of the guide portions 142 include flat parts facing and extending parallel to each other. The guide portions 142 are formed such that the distance D2 between the inner side faces 143 is smaller than the inside diameter D1 of the loose fit part 141 (see FIG. 6).

One of the guide portions 142 positioned on a rear side in the chain running direction is formed with a restricting part 144 that restricts pivoting movement of the pivoting chain guide 170 on an outer side face thereof. The restricting part 144 is planar and formed with an engaging notch 145 on one face.

Figure 3:
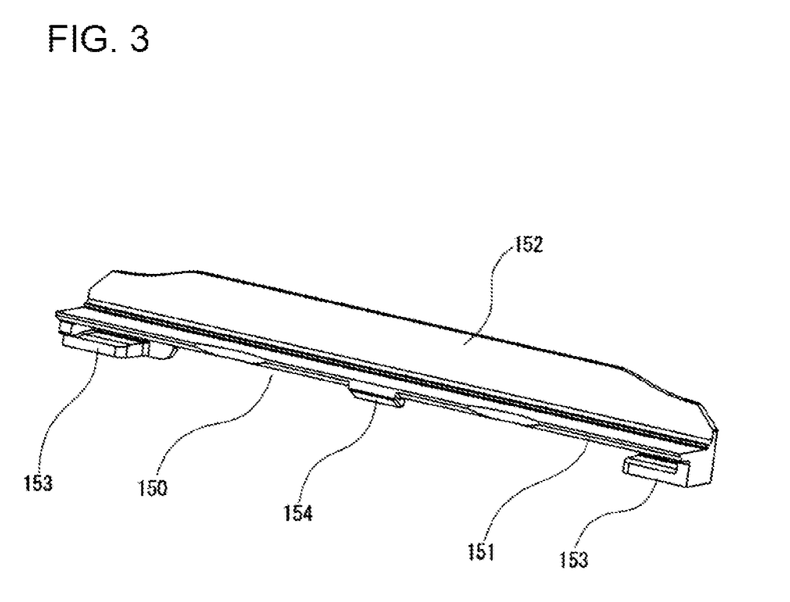
FIG. 3 is a perspective view illustrating a configuration of a top guide in the chain guide mechanism illustrated in FIG. 1.

The top guide 150 includes, as illustrated in FIG. 3, a planar sliding surface forming part 151 extending along the guide longitudinal direction and having a sliding surface thereon for guiding the chain 105, a side wall 152 upright at one side edge in the guide width direction of the sliding surface and extending over the entire guide length, engaging hooks 153 provided at both ends in the guide longitudinal direction on the back side of the sliding surface forming part 151, and an engaging protrusion 154 formed at the other side edge in the guide width direction on the back side of the sliding surface forming part 151.

The engaging hooks 153 each have a hook structure with a square U-shape cross section to be able to slide relative to the support wall 126 of the top guide support part 125 in a direction perpendicular to the guide longitudinal direction, so as to restrict movement of the top guide 150 in the guide longitudinal direction.

Figure 4:
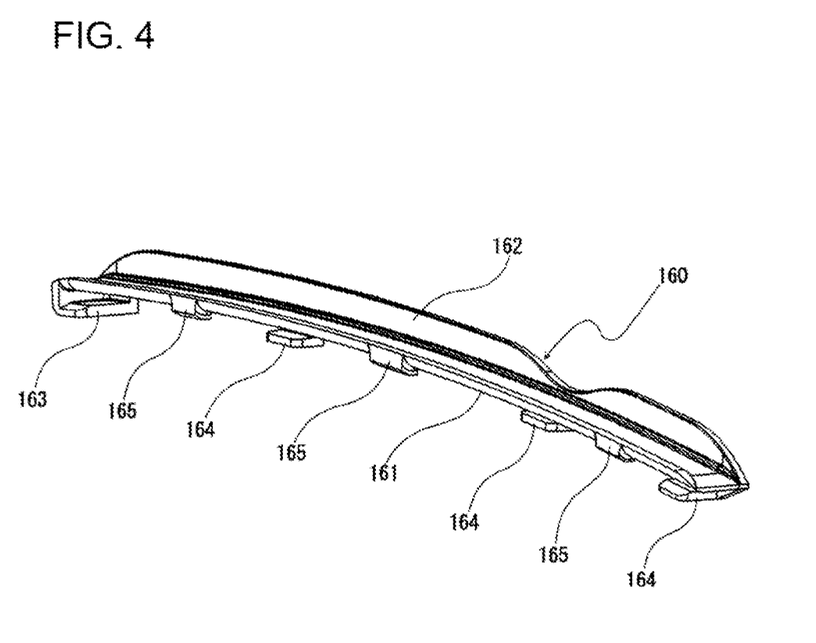
FIG. 4 is a perspective view illustrating a configuration of a fixed chain guide in the chain guide mechanism illustrated in FIG. 1.

The fixed chain guide 160 includes, as illustrated in FIG. 4, a sliding surface forming part 161 extending along the guide longitudinal direction and having a sliding surface thereon for guiding the chain 105, a side wall 162 upright at one side edge in the guide width direction of the sliding surface and extending over the entire guide length, a first engaging hook 163 provided at one end in the guide longitudinal direction on the back side of the sliding surface forming part 161, a plurality of second engaging hooks 164 provided at one side edge in the guide width direction on the back side of the sliding surface forming part 161 and spaced apart in the guide longitudinal direction, and a plurality of engaging protrusions 165 formed at the other side edge in the guide width direction on the back side of the sliding surface forming part 161 and spaced apart in the guide longitudinal direction.

The first engaging hook 163 has a hook structure with a square U-shape cross section to be able to slide relative to the support wall 131 of the fixed chain guide support part 130 in a direction perpendicular to the guide longitudinal direction.

The second engaging hook 164 includes a base part extending perpendicularly to the sliding surface from the back side of the sliding surface forming part 161, and a catch portion extending from the distal end of the base part toward inside in the guide width direction.

Figure 5:
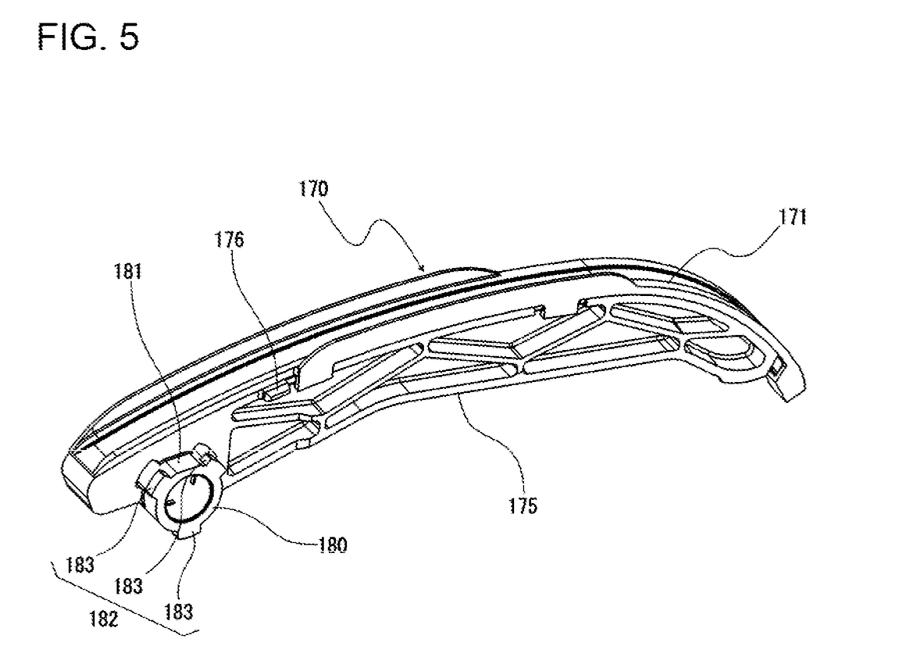
FIG. 5 is a perspective view illustrating a configuration of a pivoting chain guide in the chain guide mechanism illustrated in FIG. 1.

The pivoting chain guide 170 has a guide shoe 171 slidably guiding the running chain 105, and a guide body 175 attached to the guide shoe 171 and supporting the guide shoe 171 along the guide longitudinal direction, as illustrated in FIG. 5.

The guide body 175 includes a cylindrical mounting boss 180 at one end in the guide longitudinal direction, which serves as the pivot shaft.

Figure 6:
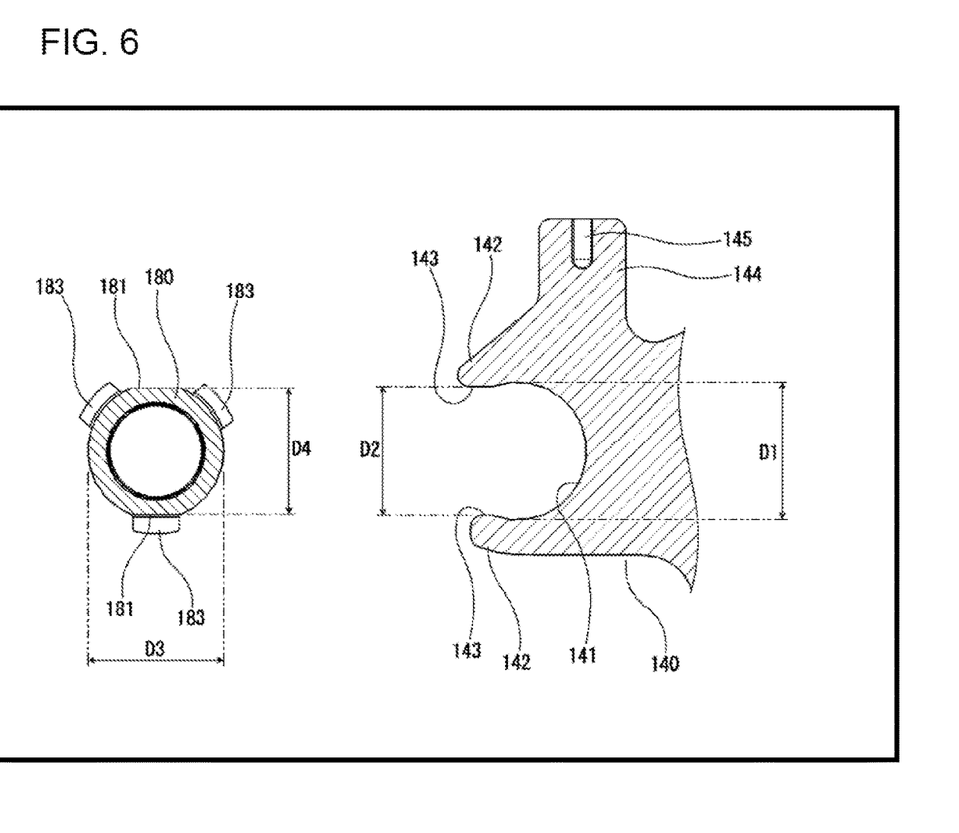
FIG. 6 is a cross-sectional view illustrating the mounting boss of the pivoting chain guide illustrated in FIG. 5, with a pivoting chain guide holding part of the frame.

As illustrated in FIG. 6, the mounting boss 180 has an outside diameter D3 that is smaller than the inside diameter D1 of the loose fit part 141 of the pivoting chain guide holding part 140 and larger than the distance D2 between the inner side faces 143 of the guide portions 142, and protrudes outward from one side in the guide width direction.

The mounting boss 180 has a double flat side part 181 which is a pair of flat surfaces parallel to each other.

The width D4 of the double flat side part 181 is smaller than the distance D2 between the inner side faces 143 of the guide portions 142, so that the mounting boss 180 with its double flat side part 181 parallel to the inner side faces 143 of the guide portions 142 can be fitted to the pivoting chain guide holding part 140 from one side.

On the outer circumferential surface at the distal end of the mounting boss 180 is formed a retainer part 182 which, when one side of the pivoting chain guide 170 is in surface contact with one face of the pivoting chain guide holding part 140, engages with the other face of the pivoting chain guide holding part 140.

The retainer part 182 is made up of, for example, a plurality of locking tabs 183 circumferentially spaced apart on the mounting boss 180 such that at least two locking tabs 183 always engage with the other face of the pivoting chain guide holding part 140.

The pivoting chain guide 170 is formed with an engaging protrusion 176 on one side thereof, which is to be engaged with the engaging notch 145 in the pivoting chain guide holding part 140 and configured to be able to engage with a side face of the restricting part 144 when the pivoting chain guide 170 is rotated.

Various components of the chain guide mechanism 100 described above are assembled into a unit as described below.

The drive-side sprocket 101 and two driven-side sprockets 102 and 103 are supported respectively on the drive-side sprocket support part 111 and the driven-side sprocket support parts 115 and 120 and are united with the frame 110 by laying the chain 105 over them.

The top guide 150 is slid from one side of the frame 110 to bring the engaging hooks 153 into engagement with the support wall 126 of the top guide support part 125 and to insert the engaging protrusion 154 into the engaging hole 127 of the top guide support part 125, whereby the top guide 150 is united with the frame 110 while being restricted from moving in the guide longitudinal direction.

The fixed chain guide 160 is slid from one side of the frame 110 to bring the first engaging hook 163 and second engaging hooks 164 into engagement with the support wall 131 of the fixed chain guide support part 130 and to insert the engaging protrusions 165 into the engaging holes 132 of the fixed chain guide support part 130, whereby the fixed chain guide 160 is united with the frame 110 while being restricted from moving in the guide longitudinal direction.

Figure 7A:
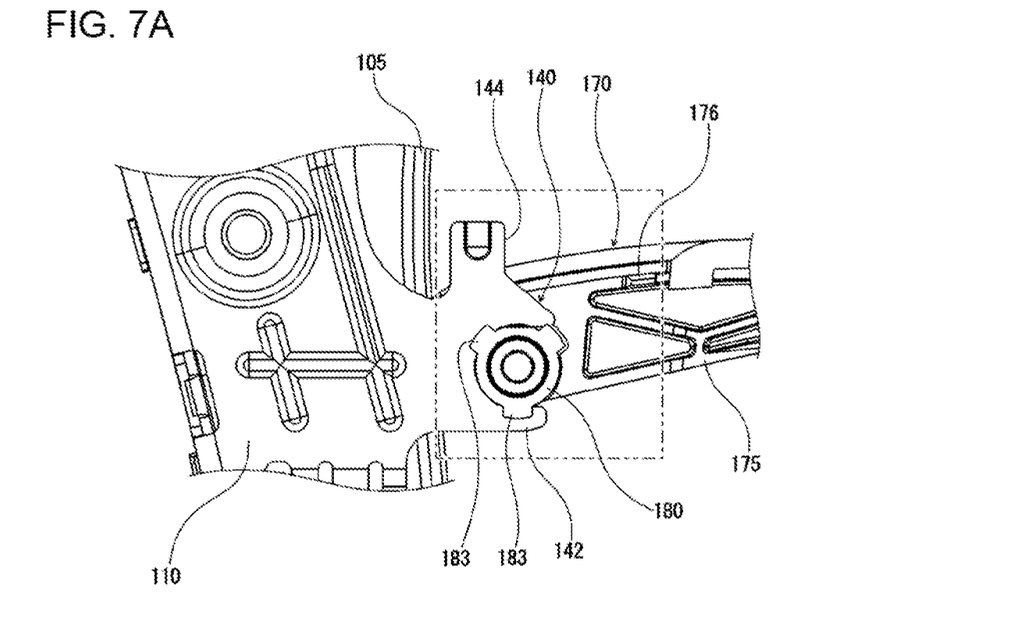
FIG. 7A is a schematic plan view illustrating a state in which the mounting boss of the pivoting chain guide is inserted in the pivoting chain guide holding part of the frame.
Figure 7B:
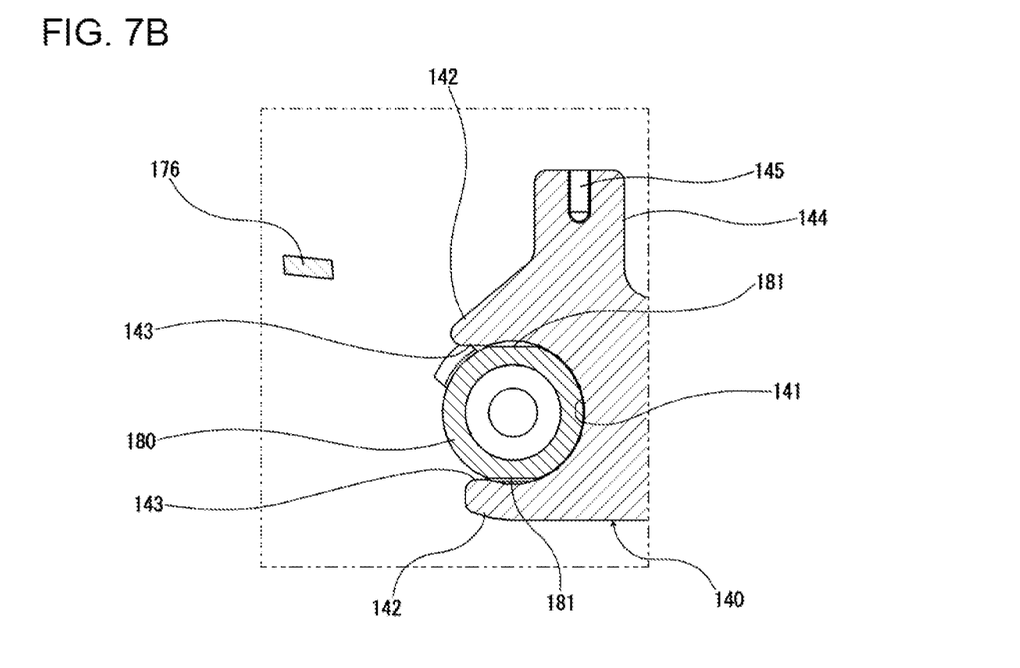
FIG. 7B is a cross-sectional view of a region surrounded by the two-dot chain line in FIG. 7A, seen from one side of the frame.

The pivoting chain guide 170 is installed such that, with the double flat side part 181 of the mounting boss 180 being set parallel with the inner side faces 143 of the guide portions 142 of the pivoting chain guide holding part 140, the pivoting chain guide 170 is moved along one side face thereof to fit the mounting boss 180 to the pivoting chain guide holding part 140 as illustrated in FIG. 7A and FIG. 7B. The width D4 of the double flat side part 181 is smaller than the distance D2 between the inner side faces 143 of the guide portions 142, so that the pivoting chain guide 170 can be smoothly attached to the frame 110. The two locking tabs 183 engage with the other face of the pivoting chain guide holding part 140 to prevent the pivoting chain guide 170 from tilting.

Figure 8A:
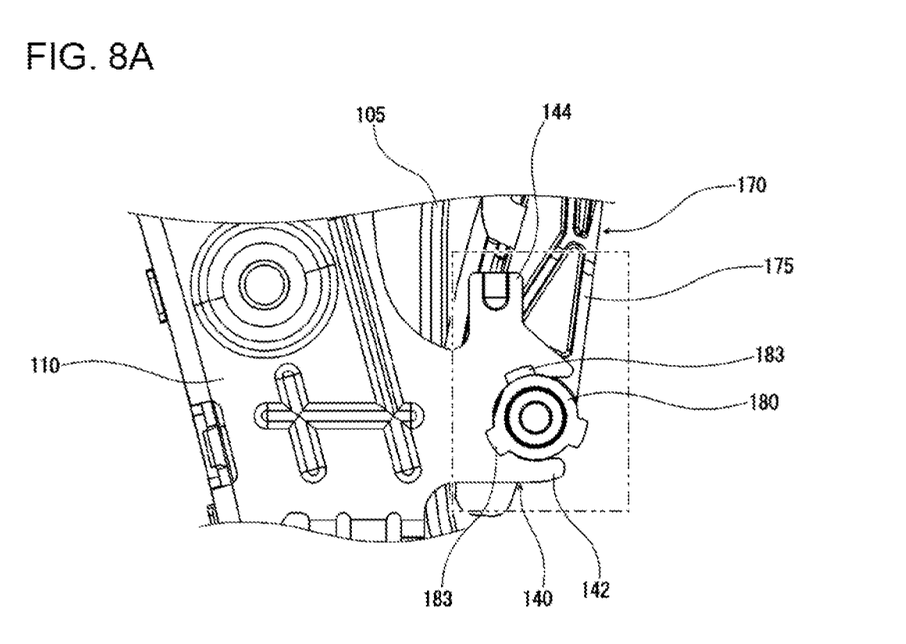
FIG. 8A is a schematic plan view illustrating a state in which an engaging protrusion of the pivoting chain guide is engaged with an engaging notch in the frame.
Figure 8B:
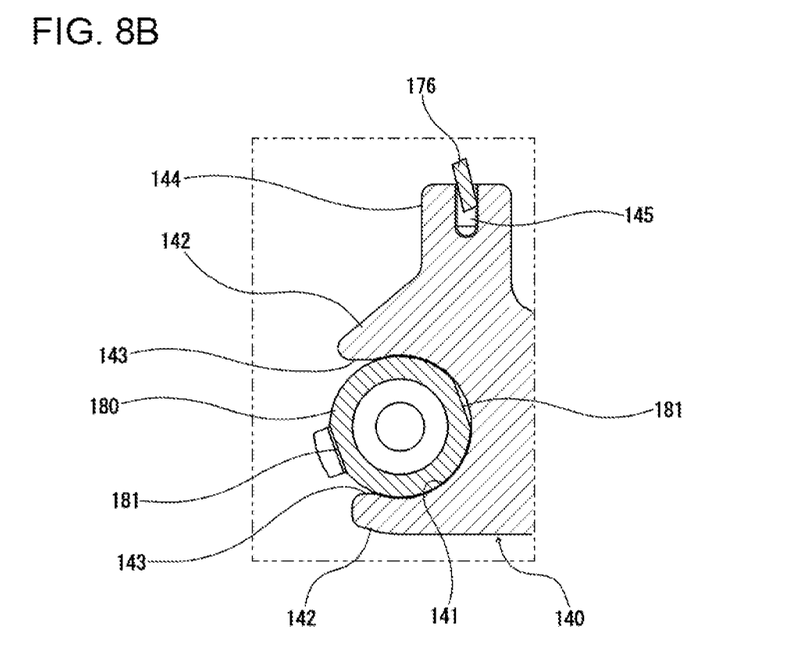
FIG. 8B is a cross-sectional view of a region surrounded by the two-dot chain line in FIG. 8A, seen from one side of the frame.

Next, as illustrated in FIG. 8A and FIG. 8B, the pivoting chain guide 170 is rotated to a direction in which it presses the chain 105 to bring the engaging protrusion 176 on the guide body 175 into engagement with the engaging notch 145 of the pivoting chain guide holding part 140, to fasten the pivoting chain guide 170 in position with a loose fit on the pivoting chain guide holding part 140. In this state, since the outside diameter D3 of the mounting boss 180 is larger than the distance D2 between the inner side faces 143 of the guide portions 142, the pivoting chain guide 170 can be prevented from separating from the frame 110, i.e., the pivoting chain guide 170 is thus united with the frame 110. The two locking tabs 183 kept in engagement with the other face of the pivoting chain guide holding part 140 prevent the pivoting chain guide 170 from tilting when the pivoting chain guide 170 is rotated.

Moreover, as the pivoting chain guide 170 is rotated it presses the chain 105, which ensures that the drive-side sprocket 101 and two driven-side sprockets 102 and 103 are supported more firmly respectively on the drive-side sprocket support part 111 and the driven-side sprocket support parts 115 and 120.

Thus the drive-side sprocket 101, two driven-side sprockets 102 and 103, chain 105, top guide 150, fixed chain guide 160, and pivoting chain guide 170 can be configured as one assembly, all integrally supported on the frame 110.

Figure 9A:
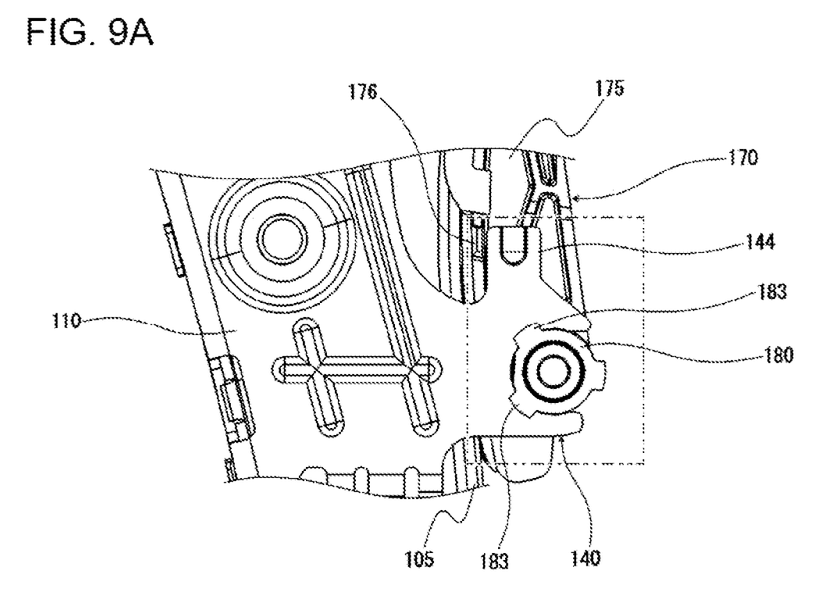
FIG. 9A is a schematic plan view illustrating a state in which an engaging protrusion of the pivoting chain guide is engaged with a side face of a restricting part of the frame.
Figure 9B:
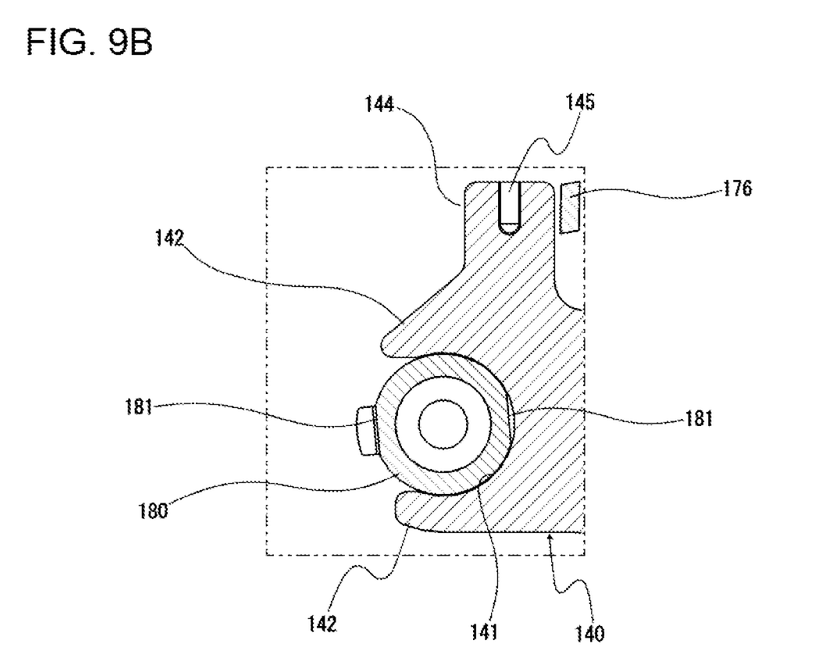
FIG. 9B is a cross-sectional view of a region surrounded by the two-dot chain line in FIG. 9A, seen from one side of the frame.

The chain guide mechanism 100 according to this embodiment is inserted into the engine block, with all the components united. At this time, as illustrated in FIG. 9A and FIG. 9B, the pivoting chain guide 170 is rotated further to the direction in which it presses the chain 105 to bring the engaging protrusion 176 on the guide body 175 into engagement with one side face of the restricting part 144 of the pivoting chain guide holding part 140, to fasten the pivoting chain guide 170 in a state in which it is prohibited from rotating in a direction away from the chain 105. This restricts the pivoting chain guide 170 from pivoting freely, which helps improve the work efficiency during assembly or maintenance.

The drive-side sprocket 101 is then attached to the crankshaft, and the two driven-side sprockets 102 and 103 are each attached to the cam shafts. A mounting shaft is inserted into the mounting boss 180 of the pivoting chain guide 170, to secure the chain guide mechanism 100 inside the engine room.

As described above, the chain guide mechanism 100 according to the embodiment supports the components including the drive-side sprocket 101, two driven-side sprockets 102 and 103, chain 105, top guide 150, fixed chain guide 160, and pivoting chain guide 170 integrally on the frame 110 so that they can be assembled into one unit. The pivoting chain guide 170, in particular, can be united with the frame 110 by inserting the mounting boss 180 from one side and by rotating the pivoting chain guide 170 on the frame 110. Thus the operation of integrating various components is made easy with a simple structure, and the work efficiency during assembly or maintenance can be improved.

While one embodiment of the present invention has been described in detail, the present invention is not limited to the embodiment described above and may be carried out with various design changes without departing from the scope of the present invention set forth in the claims.

For example, the chain guide mechanism of the present invention may not necessarily include the top guide, in which case the top guide support part need not be provided to the frame.

The retainer part of the mounting boss may be formed all around the mounting boss.

The frame need not necessarily be formed by processing a metal plate.

While the chain guide mechanism described above is provided for a timing system inside an engine in the embodiment described above, the chain guide mechanism is applicable not only to this but to various equipment.

The chain guide mechanism is applicable in various industrial fields including similar drive mechanisms using not only chains, but also belts, ropes and the like.

What is claimed is:

1. A chain guide mechanism capable of integrally supporting components on a frame, the components including a plurality of sprockets, a chain that is passed over the plurality of sprockets, and a fixed chain guide and a pivoting chain guide that slidably guide the chain, the pivoting chain guide including a cylindrical mounting boss protruding outward from one side in a guide width direction, the frame including a sprocket support part that supports each of the plurality of sprockets when the chain is passed over the sprockets, a fixed chain guide support part that supports the fixed chain guide, and a pivoting chain guide holding part that holds the cylindrical mounting boss in a state of a loose fit, the pivoting chain guide holding part being configured to allow the cylindrical mounting boss to be fitted therethrough from one side, the cylindrical mounting boss has, on an outer circumferential surface, a double flat side part that is a pair of flat surfaces parallel to each other, the pivoting chain guide holding part has a planar shape and includes a loose fit part in C shape in plan view from an axial direction of the cylindrical mounting boss, and guide portions each provided at both ends of the loose fit part, and the pivoting chain guide holding part is configured so as to hold the pivoting chain guide in a pivotable manner when the double flat side part is inserted between opposite inner side faces of the guide portions and the pivoting chain guide is rotated.

2. The chain guide mechanism according to claim 1, wherein an outer circumferential surface at a distal end of the cylindrical mounting boss is formed with a retainer part, which, when the one side of the pivoting chain guide is in surface contact with one face of the pivoting chain guide holding part, engages with another face of the pivoting chain guide holding part.

3. The chain guide mechanism according to claim 2, wherein the retainer part is made up of a plurality of locking tabs circumferentially spaced apart on the cylindrical mounting boss such that at least two locking tabs always engage with the other face of the pivoting chain guide holding part.

4. The chain guide mechanism according to claim 1, wherein the pivoting chain guide holding part includes a planar restricting part on an outer side face on a rear side in a chain running direction of the loose fit part to restrict pivoting movement of the pivoting chain guide during assembly, and the planar restricting part is formed with an engaging notch on a face thereof positioned on the pivoting chain guide side, and the pivoting chain guide is formed with, on the one side thereof, an engaging protrusion, which is to be engaged with the engaging notch and configured to be able to engage with a side face of the planar restricting part when the pivoting chain guide is rotated.

* * * * *